United States Patent
Elabd et al.

(10) Patent No.: US 11,269,371 B1
(45) Date of Patent: Mar. 8, 2022

(54) METHOD AND APPARATUS FOR HIGH SPEED CLOCK DISTRIBUTION

(71) Applicant: Realtek Semiconductor Corp., Hsinchu (TW)

(72) Inventors: Salma Elabd, San Jose, CA (US); Fei Song, San Jose, CA (US); Chia-Liang (Leon) Lin, Fremont, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 44 days.

(21) Appl. No.: 17/034,053

(22) Filed: Sep. 28, 2020

(51) Int. Cl.
*G06F 1/10* (2006.01)
*H04L 7/00* (2006.01)

(52) U.S. Cl.
CPC .............. *G06F 1/10* (2013.01); *H04L 7/0008* (2013.01)

(58) Field of Classification Search
CPC ................................. G06F 1/10; H04L 7/0008
USPC .................................. 327/291, 293, 295, 297
See application file for complete search history.

(56) References Cited

U.S. PATENT DOCUMENTS

| | | | |
|---|---|---|---|
| 10,224,905 B1* | 3/2019 | Lin | H03K 3/356104 |
| 10,365,682 B1* | 7/2019 | Lin | G01R 31/31727 |
| 2007/0052490 A1* | 3/2007 | Shigemori | H04L 7/0008 331/107 A |
| 2007/0285179 A1* | 12/2007 | Ikeda | G06F 1/10 331/56 |
| 2011/0006850 A1* | 1/2011 | Shibasaki | H03B 5/1228 331/55 |
| 2018/0294798 A1* | 10/2018 | Li | H03H 11/0405 |

* cited by examiner

*Primary Examiner* — William Hernandez
(74) *Attorney, Agent, or Firm* — McClure, Qualey & Rodack, LLP

(57) ABSTRACT

A clock distribution network includes receiving a remote voltage signal; transmitting the remote voltage signal into a local voltage signal using a current-mode transmission scheme that comprises a cascade of a voltage-to-current driver, a transmission line, a current buffer, and a LC (inductor-capacitor) tank; transmitting the local voltage signal into a first destination voltage signal using a voltage-mode transmission scheme that comprises a cascade of a first capacitively driven wire and a first inverter buffer; and transmitting the local voltage signal into a second destination voltage signal using a voltage-mode transmission scheme that comprises a cascade of a second capacitively driven wire and a second inverter buffer.

11 Claims, 5 Drawing Sheets

METHOD AND APPARATUS FOR HIGH SPEED CLOCK DISTRIBUTION

BACKGROUND OF THE DISCLOSURE

Field of the Disclosure

The present disclosure generally relates to clock distribution, and more particularly to a method and circuit for transmitting a high-speed clock over relatively long transmission lines.

Description of Related Art

A clock is a voltage signal that oscillates between a low level and a high level. Clocks are widely used in synchronous digital circuits for coordinating actions of said synchronous digital circuits. An integrated circuit that contains a plurality of synchronous digital circuits usually has a clock generation circuit, e.g. a phase lock loop, configured to generates a clock, which usually needs to be transmitted through a transmission line to said plurality of synchronous digital circuits to coordinate actions thereof. In a case where the clock generation circuit and a synchronous digital circuit that needs to receive the clock from the clock generation circuit are physically separated by a long distance, the transmission of the clock might be challenging. A transmission line is considered long if a length of the transmission line is appreciable relative to a wavelength of the clock signal. For instance, for a 15 giga-Hertz clock that has a wavelength of 10 mm, a 2 mm transmission line can be considered long as far as the clock transmission is concerned. The long distance transmission of the clock usually suffers a large insertion loss, resulting in a weak signal on the receiving end. The problem worsens when the clock is a high-speed clock, since the insertion loss of a transmission line increases as a frequency of the transmitted signal increases. For a 2 mm transmission line fabricated on a silicon substrate using a CMOS (complementary metal oxide semiconductor) process, a typical insertion loss for a 15 giga-Hertz clock is 3 dB and that is considered a large insertion loss. In some cases, on the receiving end, there are a plurality of local circuits that need the clock but are physically separated to a lesser extent.

What is desired is a method for transmitting a high-speed clock over a long transmission line and distributing the high-speed clock to a plurality of local circuits that are physically separated, without suffering significant insertion loss.

SUMMARY OF THE DISCLOSURE

In an embodiment, a clock distribution network comprises: a voltage-to-current driver configured to receive a first voltage signal and output a first current signal; a transmission line configured to receive the first current signal and output a second current signal; a current buffer configured to receive the second current signal and output a third current signal; a LC (inductor-capacitor) tank configured to receive the third current signal and establish a second voltage signal; a first CDW (capacitively driven wire) configured to receive the second voltage signal and output a third voltage signal; a first inverter buffer configured to receive the third voltage signal and output a fourth voltage signal; a second CDW configured to receive the second voltage signal and output a fifth voltage signal; and a second inverter buffer configured to receive the fifth voltage signal and output a sixth voltage signal.

In an embodiment, a method of clock distribution comprises: receiving a first voltage signal; converting the first voltage signal into a first current signal using a voltage-to-current driver; transmitting the first current signal into a second current signal using a transmission line; relaying the second current signal into a third current signal using a current buffer; converting the third current signal into a second voltage signal using a LC (inductor-capacitor) tank as a load; transmitting the second voltage signal into a third voltage signal using a first CDW (capacitively driven wire); amplifying the third voltage signal into a fourth voltage signal using a first inverter buffer; transmitting the second voltage signal into a fifth voltage signal using a second CDW; and amplifying the fifth voltage signal into a sixth voltage signal using a second inverter buffer.

In an embodiment, a method of clock distribution comprises: receiving a remote voltage signal; transmitting the remote voltage signal into a local voltage signal using a current-mode transmission scheme that comprises a cascade of a voltage-to-current driver, a transmission line, a current buffer, and a LC (inductor-capacitor) tank; transmitting the local voltage signal into a first destination voltage signal using a voltage-mode transmission scheme that comprises a cascade of a first capacitively driven wire and a first inverter buffer; and transmitting the local voltage signal into a second destination voltage signal using a voltage-mode transmission scheme that comprises a cascade of a second capacitively driven wire and a second inverter buffer.

DETAILED DESCRIPTION OF THIS DISCLOSURE

Figure 1:
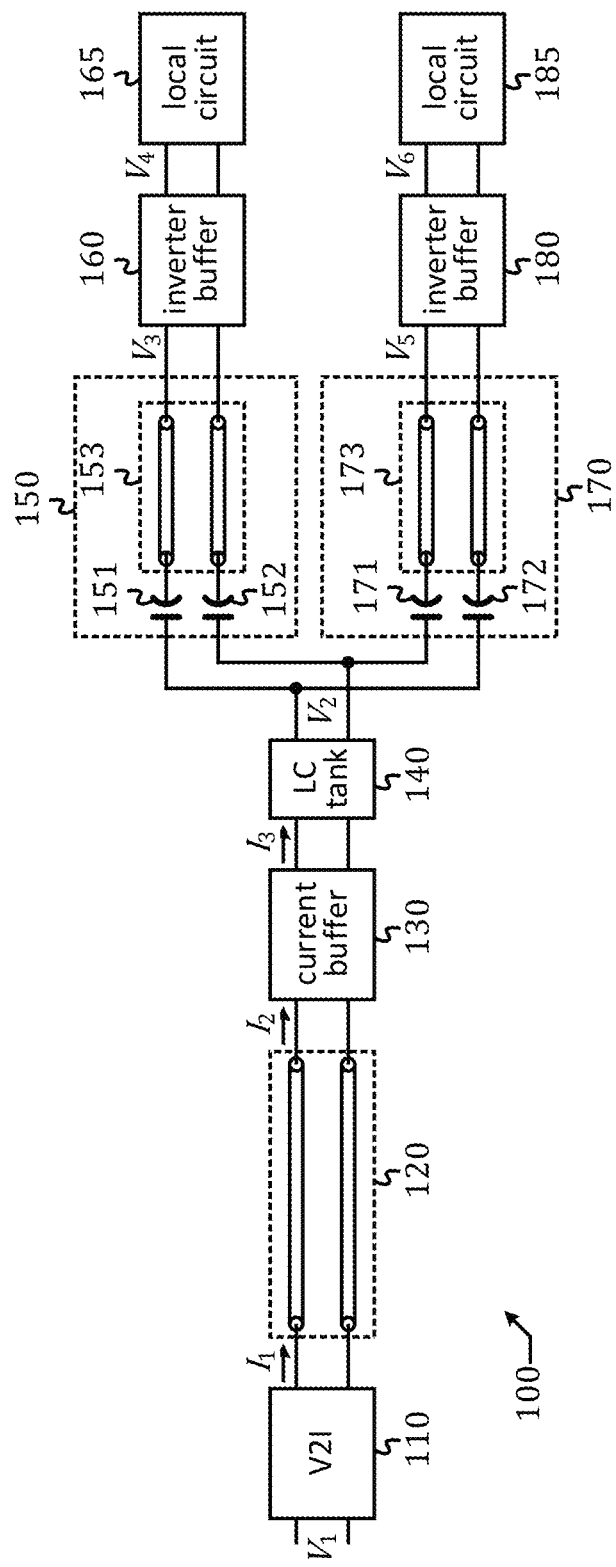
FIG. 1 shows a schematic diagram of a clock distribution network in accordance with an embodiment of the present disclosure.

The present disclosure is directed to circuits and methods for high-speed clock distribution. While the specification describes several example embodiments of the disclosure considered favorable modes of practicing the invention, it should be understood that the invention can be implemented in many ways and is not limited to the particular examples described below or to the particular manner in which any features of such examples are implemented. In other instances, well-known details are not shown or described to avoid obscuring aspects of the disclosure.

Persons of ordinary skill in the art understand terms and basic concepts related to microelectronics that are used in this disclosure, such as "circuit node," "power supply node," "ground node," "differential signal," "differential pair," "voltage," "current," "CMOS (complementary metal oxide semiconductor)," "PMOS (P-channel metal oxide semiconductor) transistor," "NMOS (N-channel metal oxide semiconductor) transistor," "resistor," "inductor," "capacitor,"

"inverter," "buffer," "LC (inductor-capacitor) tank," "clock," "signal," "amplifier," "common-source," "common-gate," "impedance," "transmission line," and "load." Terms and basic concepts like these, when used in a context of microelectronics, are apparent to those of ordinary skill in the art and thus will not be explained in detail here.

Those of ordinary skills in the art can read schematics of a circuit comprising components such as capacitors, inductors, resistors, NMOS transistors, PMOS transistors, and so on, and do not need a verbose description about how one component connects with another in the schematics. Pertaining to a MOS transistor, for brevity, hereafter, "source terminal" is simply referred to as "source," "gate terminal" is simply referred to "gate," and "drain terminal" is simply referred to "drain." Those of ordinary skill in the art can also recognize symbols of PMOS transistor and NMOS transistor, and identify the "source," the "gate," and the "drain" thereof. Those of ordinary skill in the art also understand units such as GHz (giga-Hertz), (micron), nm (nano-meter), KOhm (kilo-Ohm), nH (nano-Henry), fF (femto-Farad).

This disclosure is presented in an engineering sense, instead of a rigorous mathematical sense. For instance, "A is equal to B" means "a difference between A and B is smaller than an engineering tolerance.

Throughout this disclosure, a ground node is used as a reference node of zero voltage (0V) electrical potential. A power supply node is denoted by "$V_{DD}$."

A circuit is a collection of a transistor, a capacitor, a resistor, and/or other electronic devices inter-connected in a certain manner to embody a certain function. A network is a circuit or a collection of circuits.

A signal is a voltage or a current of a level that can vary, and the level represents certain information.

A clock is a voltage signal that cyclically toggles back and forth between a low level and a high level.

A transmission of a signal involves using a transmitter to transmit a signal, a transmission line to propagate the signal, and a receiver to receive the signal. A current-mode transmission scheme uses a receiver of a low input impedance; in this case, an input impedance of the receiver is smaller than an output impedance of the transmitter. A voltage-mode transmission scheme uses a receiver of a high input impedance; in this case, an input impedance of the receiver is larger than an output impedance of the transmitter.

A current buffer is a circuit that receives an input current from an input side and output an output current on an output side, so that an input impedance on the input side is low, an output impedance on the output side is high, while the input impedance is substantially independent of a loading condition on the output side.

A schematic diagram of a clock distribution network 100 in accordance with an embodiment of the present disclosure is shown in FIG. 1. A purpose of the clock distribution network 100 is to transmit a clock from a remote location to a local location and then distribute the clock to a plurality of local circuits. By way of example but not limitation, two local circuits are shown. Clock distribution network 100 comprises: a voltage-to-current driver (V2I) 110 configured to receive a first voltage signal $V_1$ and output a first current signal $I_1$; a transmission line 120 configured to propagate the first current signal $I_1$ into a second current signal $I_2$; a current buffer 130 configured to receive the second current signal $I_2$ and output a third current signal $I_3$; a LC tank 140 configured to receive the third current signal $I_3$ and output a second voltage signal $V_2$; a first CDW (capacitively driven wire) 150 configured to receive the second voltage signal $V_2$ and output a third voltage signal $V_3$; a first inverter buffer 160 configured to receive the third voltage signal $V_3$ and output a fourth voltage signal $V_4$; a first local circuit 165 configured to receive the fourth voltage signal $V_4$; a second CDW 170 configured to receive the second voltage signal $V_2$ and output a fifth voltage signal $V_5$; a second inverter buffer 180 configured to receive the fifth voltage signal $V_5$ and output a sixth voltage signal $V_6$; and a second local circuit 185 configured to receive the sixth voltage signal $V_6$. The voltage-to-current driver 110 is located at a remote location, while the current buffer 130, LC tank 140, the two CDW 150 and 170, the two inverter buffers 160 and 180, and the two local circuits 165 and 185 are all located at a local location.

The first voltage signal $V_1$ is a remote voltage signal. The second voltage signal $V_2$ is a local voltage signal. The fourth voltage signal $V_4$ is a first destination voltage signal. The sixth voltage signal $V_6$ is a second destination voltage signal.

The first voltage signal $V_1$ is a high-speed clock. The voltage-to-current driver 110 converts the first voltage signal $V_1$ into the first current signal $I_1$, which propagates into the second current signal $I_2$ along the transmission line 120. A purpose of the current buffer 130 and LC tank 140 is to convert the second current signal $I_2$ into the second voltage signal $V_2$ such that $V_2$ can have a large swing. Here, a current-mode transmission scheme is employed, wherein the current buffer 130 presents a low impedance for the second current signal $I_2$ to flow in and pass through and become the third current signal $I_3$. The current-mode transmission scheme offers an advantage of low insertion loss, as an insertion loss from the transmission line 120 is mostly manifested in a form of voltage drop, which in a current-mode transmission scenario is not an issue. The current buffer 130 has a high output impedance and LC tank 140 embodies a load. A resonant frequency of the LC tank is tuned to a frequency of the high-speed clock. This way, LC tank 140 can have a high impedance for the third current signal $I_3$, and the second voltage signal $V_2$ can have a large swing.

The second voltage signal $V_2$ needs to be delivered to the first local circuit 165 and the second local circuit 185 that albeit are both local but still are physically apart from the LC tank 140. CDW 150 and CDW 170 are used for local transmission. Here, a voltage-mode transmission is used, while a disadvantage of a higher insertion loss than a current-mode transmission is less of a concern due to a short transmission distance. On the other hand, voltage-mode transmission offers an advantage of ease of receiving, and an inverter buffer, such as inverter buffer 160 and inverter buffer 180, can be used, as a receiver circuit of high impedance input is usually easier to implement than a receiver circuit of a low input impedance. Using capacitively driven wire, such as CDW 150 and CDW 170, offers an advantage of high input impedance, thus alleviating a loading effect to the LC tank 140. This way, the second voltage signal $V_2$ can maintain a large swing despite a loading of CDW 150 and CDW 170. CDW 150 and CDW 170 both cause insertion loss, therefore the third voltage signal $V_3$ and the fifth voltage signal $V_5$ have a smaller swing than the second voltage signal $V_2$. Inverter buffers 160 and 180 are used to perform amplification and restore the voltage swing so that the fourth voltage signal $V_4$ and the sixth voltage signal $V_6$ can have a large swing.

In an embodiment, differential signaling is used, wherein a signal, voltage or current, comprises a first component labeled with a subscript "+" and a second component labeled with a subscript "−." Specifically, $V_1$ comprises $V_{1+}$ and $V_{1-}$, $V_2$ comprises $V_{2+}$ and $V_{2-}$, $V_3$ comprises $V_{3+}$ and $V_{3-}$, $V_4$ comprises $V_{4+}$ and $V_{4-}$, $V_5$ comprises $V_{5+}$ and $V_{5-}$, $V_6$ comprises $V_{6+}$ and $V_{6-}$, $I_1$ comprises $I_{1+}$ and $I_{1-}$, $I_2$ comprises $I_{2+}$ and $I_{2-}$, and $I_3$ comprises $I_{3+}$ and $I_{3-}$. Differential signaling is well known to those of ordinary skill in the art and thus not described in detail here.

Figure 2:
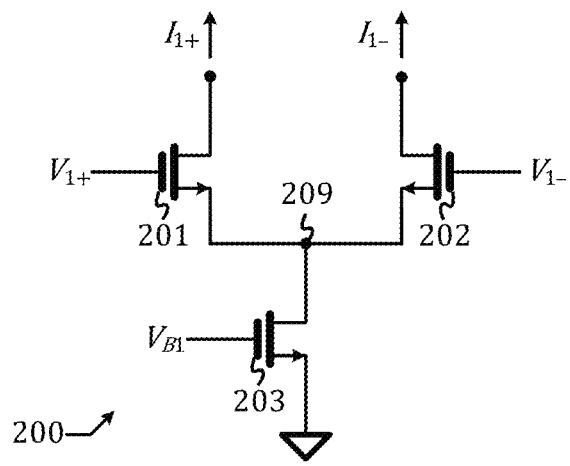
FIG. 2 shows a schematic diagram of a voltage-to-current driver.

The voltage-to-current driver 110 embodies a voltage to current conversion. A schematic diagram of a voltage-to-current driver 200 that can be used to embodiment the voltage-to-current driver 110 is shown in FIG. 2. As mentioned earlier, differential signaling is used: $V_{1+}$ and $V_{1-}$ jointly embody the first voltage signal $V_1$, while $I_{1+}$ and $I_{1-}$ jointly embody the first current signal $I_1$. Voltage-to-current driver 200 comprises two NMOS transistors 201 and 202 configured to receive $V_{1+}$ and $V_{1-}$ and output $I_{1+}$ and $I_{1-}$, respectively. NMOS transistors 201 and 202 are configured as a differential pair of common-source amplifier. The voltage-to-current driver 200 further comprises another NMOS transistor 203 configured to provide a bias current to a common source node 209 for said differential pair of common-source amplifier in accordance with a first bias voltage $V_{B1}$. The voltage-to-current driver 200 is well known to those of ordinary skill in the art and thus is not further explained. In an alternative embodiment not shown in figure and clear to those of ordinary skill in the art, the NMOS transistor 203 is replaced with a resistor; this alternative embodiment is also well known and thus not further explained. Another alternative embodiment not shown in figure, but clear to those of ordinary skill in the art, the NMOS transistor 203 is replaced with a short circuit; in this case, NMOS transistors 201 and 202 form a pseudo-differential pair of common-source amplifier. This alternative embodiment is also well known and thus not further explained.

Figure 3:
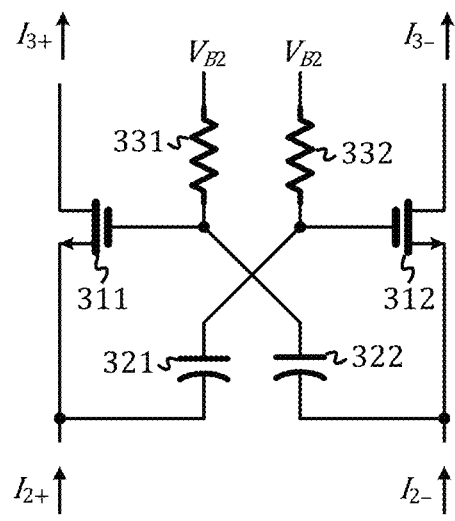
FIG. 3 shows a schematic diagram of a current buffer.

A schematic diagram of a current buffer 300 that can be used to embody the current buffer 130 is shown in FIG. 3. As mentioned earlier, differential signaling is used: $I_{2+}$ and $I_{2-}$ jointly embody the second current signal $I_2$, while $I_{3+}$ and $I_{3-}$ jointly embody the third current signal $I_3$. Current buffer 300 comprises two NMOS transistors 311 and 312 configured to receive $I_{2+}$ and $I_{2-}$ and output $I_{3+}$ and $I_{3-}$, respectively, two resistors 331 and 332 configured to establish gate bias to NMOS transistors 311 and 312, respectively, and two capacitors 321 and 322 configured to provide cross coupling between NMOS transistors 311 and 312, i.e. the gate of NMOS transistor 311 is coupled to the source of NMOS transistor 312 via capacitor 322, while the gate of NMOS transistor 312 is coupled to the source of NMOS transistor 311 via capacitor 321. NMOS transistors 311 and 312 are both configured in a common-gate amplifier topology, and a cross coupling between them can effectively enhance a gain. Here, $V_{B2}$ denotes a second bias voltage. Current buffer 300 is known in the prior art and thus not explained in detail here.

Figure 4:
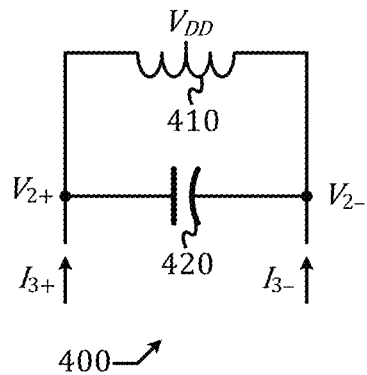
FIG. 4 shows a schematic diagram of a LC (inductor-capacitor) tank.

An LC (which stands for inductor-capacitor) tank 400 that can be used to embody the LC tank 140 is shown in FIG. 4. As mentioned earlier, differential signaling is used: $I_{3+}$ and $I_{3-}$ jointly embody the third current signal $I_3$, and $V_{2+}$ and $V_{2-}$ jointly embody the second voltage signal $V_2$. LC tank 400 comprises an inductor 410 and a capacitor 420 configured in a parallel connection topology. A center-tap of the inductor 401 connects to the power supply node $V_{DD}$. In a resonant scenario, wherein an imaginary part of an impedance of the inductor 410 and an imaginary part of an impedance of the capacitor 420 are approximately the same but of opposite polarity, LC tank 400 has a high input impedance and can make the second voltage signal $V_2$ have a large swing.

CDW 150 comprises two capacitors 151 and 152 and a transmission line 153 configured in a series connection topology. Likewise, CDW 170 comprises two capacitors 171 and 172 and a transmission line 173 configured in a series connection topology. Transmission lines 153 and 173 are local transmission lines that are shorter than transmission line 120. Due to the serial connection of capacitors 151 and 152, CDW 150 have a higher impedance looking from the LC tank 140, compared to the case where the transmission line 153 is directly connected to the LC tank 140. This is because the capacitors 151 and 152 present a high impedance upfront and prevent the LC tank from seeing the transmission line 153, which is usually equivalent to a heavy capacitive load. The same thing can be said about capacitors 171 and 172 and CDW 170.

It is noted that a transmission line is by nature a distributed network. In a lump circuit, a first element followed by a second element in a serial connection will be equivalent to the second element followed by the first circuit in a serial connection. In a distributed network, however, swapping an order of elements in a serial connection will lead to a different result. Therefore, swapping the order of capacitors 151 and 152 with the transmission line 153 will result in a different response that departs from a purpose of a capacitively driven wire.

Figure 5:
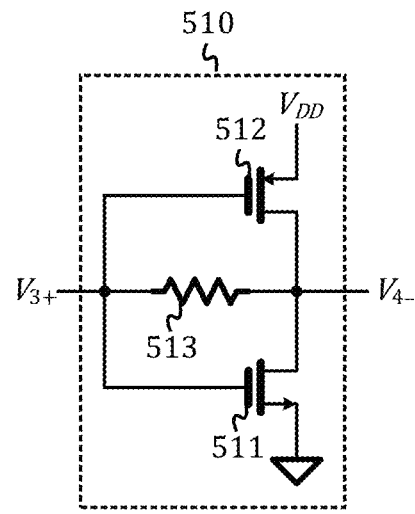
FIG. 5 shows a schematic diagram of an inverter buffer.
Figure 5:
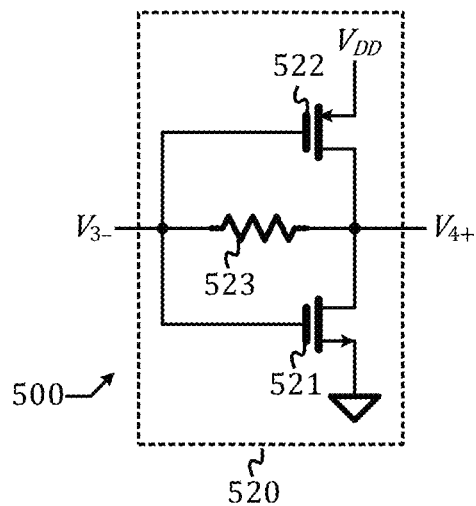

An inverter buffer 500 that can be used to embody inverter buffer 160 is shown in FIG. 5. As mentioned earlier, differential signaling is used: $V_{3+}$ and $V_{3-}$ jointly embody the third voltage signal $V_3$, and $V_{4+}$ and $V_{4-}$ jointly embody the fourth voltage signal $V_4$. Inverter buffer 500 comprises a first inverter 510 configured to receive $V_{3+}$ and output $V_{4-}$, and a second inverter 520 configured to receive $V_{3-}$ and output $V_{4+}$. Inverter 510 comprises a NMOS transistor 511, a PMOS transistor 512, and a feedback resistor 513. Inverter 520 comprises a NMOS transistor 521, a PMOS transistor 522, and a feedback resistor 523. Inverter buffer 500 is well known in the prior art and thus not described in detail here.

Inverter buffer 500 can be used to embody inverter buffer 180 by replacing $V_{3+}$, $V_{3-}$, $V_{4+}$, and $V_{4-}$ with $V_{5+}$, $V_{5-}$, $V_{6+}$, and $V_{6-}$, respectively.

Local circuits 165 and 185 are circuits that utilize $V_4$ and $V_6$, respectively, to perform certain functions, such as clock multiplication, frequency conversion, logical operations, and so on.

Transmission lines 120, 153, and 173 can be implemented in whatever embodiment known in the prior art at a discretion of circuit designers.

Figure 6:
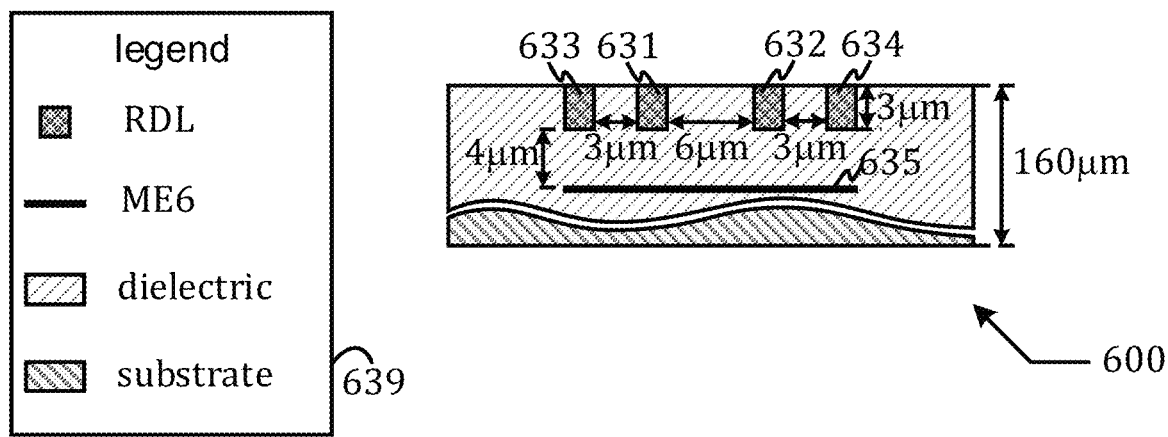
FIG. 6 shows a cross sectional view of a transmission line.

By way of example but not limitation, in an embodiment: the clock distribution network 100 is fabricated on a silicon substrate using a 28 nm CMOS process that includes a plurality of metal layers including a top metal layer, which is an aluminum layer referred to as a redistribution layer known as "RDL," an ultra-thick metal layer that is beneath the "RDL" layer, and a thin metal layer that is beneath the ultra-thick metal layer; $V_{DD}$ is 1.1V; a frequency of the first voltage signal $V_1$ is 14 GHz; W/L (which stands for width/length) is 20 μm/30 nm for both NMOS transistors 201 and 202; W/L is 40 μm/200 nm for NMOS transistors 203; W/L is 20 μm/30 nm for both NMOS transistors 311 and 312; capacitors 321 and 322 are both 100 fF; resistors 331 and 332 are both 10 KOhm; a length of transmission line 120 is 2.6 mm; inductor 410 is 0.5 nH; capacitor 420 is 260 fF; capacitors 151, 152, 171, and 172 are all 400 fF; a length of transmission line 153 is 800 μm; a length of transmission line 173 is 650 μm; W/L is 10 μm/30 nm for NMOS transistors 511 and 521; W/L is 14 μm/30 nm for PMOS transistors 512 and 522; and resistors 513 and 523 are both 10 KOhm. A cross-sectional view of a transmission line 600 that can be used to embody transmission lines 120, 153, and 173 is shown in FIG. 6. A legend is shown in box 639. Transmission line 600 comprises two parallel metal traces 631 and 632 that are both 2 μm wide and 3 μm thick and 6 μm apart and are used to transmit a current signal in a differential signaling embodiment. Metal traces 631 and 632 are laid out on the top metal "RDL" that is embedded in a dielectric material that is housed on a silicon substrate. Transmission line 600 further comprises two additional metal traces 633 and 634 that are used to provide a shielding for metal traces 631 and 632 and need to be connected to the ground node. The two additional metal traces 633 and 634 are also 2 μm wide and 3 μm thick and laid out on the "RDL" layer. The spacing between metal traces 633 and 631 is 3 μm, so is the spacing between metal traces 634 and 632. Transmission line 130 further comprises a ground plane 635 laid out on a thin metal layer denoted by "ME6," wherein the ground plane 635 is also used to provide a shielding for metal traces 631 and 632 and needs to be connected to the ground node.

Figure 7:
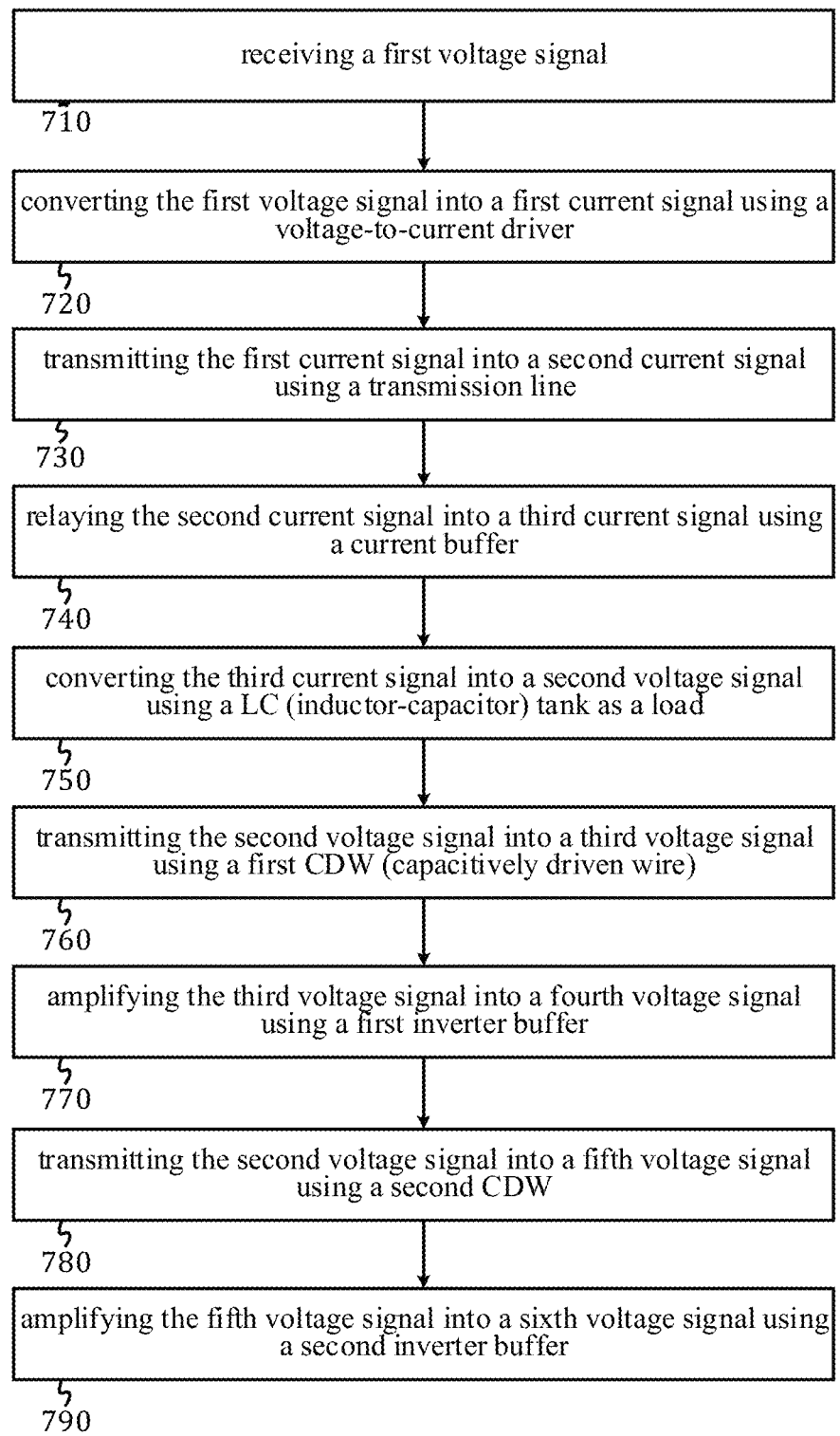
FIG. 7 shows a flow diagram of a method in accordance with an embodiment of the present disclosure.

As illustrated by a flow diagram shown in FIG. 7, a method of clock distribution in accordance with an embodiment of the present disclosure comprises: (step 710) receiving a first voltage signal; (step 720) converting the first voltage signal into a first current signal using a voltage-to-current driver; (step 730) transmitting the first current signal into a second current signal using a transmission line; (step 740) relaying the second current signal into a third current signal using a current buffer; (step 750) converting the third current signal into a second voltage signal using a LC (inductor-capacitor) tank as a load; (step 760) transmitting the second voltage signal into a third voltage signal using a first CDW (capacitively driven wire); (step 770) amplifying the third voltage signal into a fourth voltage signal using a first inverter buffer; (step 780) transmitting the second voltage signal into a fifth voltage signal using a second CDW; (step 790) amplifying the fifth voltage signal into a sixth voltage signal using a second inverter buffer.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A clock distribution network comprises:
   a voltage-to-current driver configured to receive a first voltage signal and output a first current signal;
   a transmission line configured to receive the first current signal and output a second current signal;
   a current buffer configured to receive the second current signal and output a third current signal;
   an LC (inductor-capacitor) tank configured to receive the third current signal and establish a second voltage signal;
   a first CDW (capacitively driven wire) configured to receive the second voltage signal and output a third voltage signal;
   a first inverter buffer configured to receive the third voltage signal and output a fourth voltage signal;
   a second CDW configured to receive the second voltage signal and output a fifth voltage signal; and
   a second inverter buffer configured to receive the fifth voltage signal and output a sixth voltage signal.

2. The clock distribution network of claim 1, wherein the voltage-to-current driver comprises two NMOS (n-channel metal oxide semiconductor) transistors configured as a differential pair of common-source amplifier, or a pseudo differential pair of common-source amplifier.

3. The clock distribution network of claim 1, wherein the current buffer comprises two NMOS (n-channel metal oxide semiconductor) transistors configured as a differential pair of common-gate amplifier that are cross-coupled via two capacitors.

4. The clock distribution network of claim 1, wherein the LC tank comprises a parallel connection of an inductor and a capacitor, wherein a center-tap of the inductor connects to a power supply node.

5. The clock distribution network of claim 1, wherein each of the first CDW and the second CDW comprises a serial connection of a capacitor with a transmission line.

6. A method of clock distribution comprising:
   receiving a first voltage signal;
   converting the first voltage signal into a first current signal using a voltage-to-current driver;
   transmitting the first current signal into a second current signal using a transmission line;
   relaying the second current signal into a third current signal using a current buffer;
   converting the third current signal into a second voltage signal using an LC (inductor-capacitor) tank as a load;
   transmitting the second voltage signal into a third voltage signal using a first CDW (capacitively driven wire);
   amplifying the third voltage signal into a fourth voltage signal using a first inverter buffer;
   transmitting the second voltage signal into a fifth voltage signal using a second CDW; and
   amplifying the fifth voltage signal into a sixth voltage signal using a second inverter buffer.

7. The method of clock distribution of claim 6, wherein the voltage-to-current driver comprises two NMOS (n-channel metal oxide semiconductor) transistors configured as a differential pair of common-source amplifier or a pseudo differential pair of common-source amplifier.

8. The method of clock distribution of claim 6, wherein the current buffer comprises two NMOS (n-channel metal oxide semiconductor) transistors configured as a differential pair of common-gate amplifier that are cross-coupled via two capacitors.

9. The method of clock distribution of claim 6, wherein the LC tank comprises a parallel connection of an inductor and a capacitor, wherein a center-tap of the inductor connects to a power supply node.

10. The method of clock distribution of claim 6, wherein each of the first CDW and the second CDW comprises a serial connection of a capacitor with a transmission line.

11. A method of clock distribution comprising:
    receiving a remote voltage signal;
    transmitting the remote voltage signal into a local voltage signal using a current-mode transmission scheme that comprises a cascade of a voltage-to-current driver, a transmission line, a current buffer, and an LC (inductor-capacitor) tank;
    transmitting the local voltage signal into a first destination voltage signal using a voltage-mode transmission scheme that comprises a cascade of a first capacitively driven wire and a first inverter buffer; and
    transmitting the local voltage signal into a second destination voltage signal using a voltage-mode transmission scheme that comprises a cascade of a second capacitively driven wire and a second inverter buffer.

* * * * *